United States Patent [19]

Ishii

[11] Patent Number: 5,309,477
[45] Date of Patent: May 3, 1994

[54] MEASUREMENT OF RECEIVER SENSITIVITY OF A RADIO COMMUNICATION APPARATUS BY RADIO AND OPTICAL TEST SIGNALS

[75] Inventor: Daisuke Ishii, Tokyo, Japan
[73] Assignee: NEC Corporation, Tokyo, Japan
[21] Appl. No.: 944,233
[22] Filed: Sep. 14, 1992
[30] Foreign Application Priority Data
  Sep. 13, 1991 [JP] Japan .................. 3-235131
[51] Int. Cl.$^5$ .................................... H04B 3/46
[52] U.S. Cl. ........................... 375/10; 375/40; 359/110
[58] Field of Search ............... 375/10, 7, 8, 109, 107, 375/40; 455/226.1; 371/20.1, 20.4; 359/110

[56] References Cited

U.S. PATENT DOCUMENTS

| | | | |
|---|---|---|---|
| 4,246,608 | 1/1981 | Baker | 375/10 |
| 4,506,385 | 3/1985 | Fedde et al. | 375/10 |
| 4,583,233 | 4/1986 | Barrows | 375/10 |
| 4,918,708 | 4/1990 | Pottinger et al. | 375/10 |
| 4,953,181 | 8/1990 | Keiper, Jr. | 375/10 |

Primary Examiner—Stephen Chin
Attorney, Agent, or Firm—Sughrue, Mion, Zinn, Macpeak & Seas

[57] ABSTRACT

A radio communication apparatus (21) is tested by radio and optical test signals (RTS and OTS) simultaneously transmitted by a test transmitter (22). Each test signal carries a test digital data signal. The apparatus has a radio digital data recovering section (23-25) for recovering the test digital data signal as a first digital data signal from the radio test signal. An optical digital data recovering section (39-42, 44-46) recovers the test digital data signal as a second digital data signal from the optical test signal. A comparing section (48-52) produces a bit coincidence signal whenever corresponding bits between the first and the second digital data signals coincides with each other. A counter (54) counts up a count to an increased count in response to the bit coincidence signal during a predetermined time interval. An indicator (30-32) indicates the increased count as sensitivity of the apparatus.

9 Claims, 7 Drawing Sheets

FIG. I

MEASUREMENT OF RECEIVER SENSITIVITY OF A RADIO COMMUNICATION APPARATUS BY RADIO AND OPTICAL TEST SIGNALS

BACKGROUND OF THE INVENTION

This invention relates to a radio communication apparatus for use in combination with a test transmitter for testing the radio communication apparatus in order to measure a receiver sensitivity of the radio communication apparatus. This invention relates also to the test transmitter. The radio communication apparatus may be a radio paging receiver, a transceiver, or the like although description will be mainly directed to the radio paging receiver.

A radio paging receiver of the type described, is for receiving a radio communication signal which carries a communication digital data signal. The radio paging receiver generally comprises a radio digital data recovering section for recovering the communication digital data signal from the radio communication signal. Connected to the radio digital data recovering section, a data processing section processes the communication digital data signal into a processed data signal. Connected to the data processing section, an announcing section carries out an announcing operation of producing an announcement to an attendant to the radio paging receiver in response to the processed data signal.

A test transmitter of the type described, generally comprises a test signal generator for generating a test digital data signal. Connected to the test signal generator, a radio test signal transmitting section transmits the radio test signal which carries the test digital data signal.

On using the test transmitter in testing the radio paging receiver so as to measure a receiver sensitivity of the radio paging receiver in relation to the communication digital data signal, the test digital data signal is made to represent an identification number specific to the radio paging receiver.

When the radio test signal has a high electric field strength, the radio paging receiver can correctly receive the test digital data signal with the test digital data signal subjected to no bit error. In this case, the radio digital data recovering section correctly recovers the test digital data signal from the radio test signal in the radio paging receiver. The data processing section processes the test digital data signal into the processed data signal. The announcing section duly carries out the announcing operation.

When the radio test signal has a low electric field strength, the radio paging receiver may receive the test digital data signal with the test digital data signal subjected to bit errors. Inasmuch as the radio paging receiver can not correctly receive the test digital data signal in this case, the data processing section does not produce the processed data signal. The announcing section does not carry out the announcing operation.

Conventionally, the receiver sensitivity of the radio paging receiver is defined as a lowest electric field strength in which the radio paging receiver can carry out the announcing operation. Inasmuch as the receiver sensitivity (that is, the lowest electric field strength of the radio test signal) is determined by judging whether or not the radio paging receiver carries out the announcing operation, it is necessary to make the test signal generator of the test transmitter generate the test digital data signal which represents the identification number specific to the radio paging receiver. When a different radio paging receiver is tested, it is necessary to make the test signal generator generate the test digital data signal which represents a different identification number specific to the different radio paging receiver. This results in an increase in labor and time of measurement of the receiver sensitivity in proportion to an increase in the number of the radio paging receivers.

Furthermore, it is difficult to quantitatively know the number of either correct bits or erroneous bits in the test digital data signal carried by the radio test signal which the radio paging receiver receives when the radio test signal has a particular electric field strength between the high electric field strength and the low electric field strength.

SUMMARY OF THE INVENTION

It is therefore an object of this invention to provide a radio communication apparatus operable in combination with a test transmitter, which apparatus is capable of quantitatively measuring, as a receiver sensitivity of the radio communication apparatus, the number of correct or nonerroneous bits in a test digital data signal carried by a radio test signal which the radio communication apparatus receives when the radio test signal has a particular electric field strength.

It is another object of this invention to provide a radio communication apparatus of the type described, wherein it is unnecessary to make a test signal generator of the test transmitter generate the test digital data signal which represents an identification number specific to the radio communication apparatus.

It is still another object of this invention to provide a radio communication apparatus of the type described, wherein it is possible to decrease labor and time of measurement of the receiver sensitivity of the radio communication apparatus.

It is a further object of this invention to provide a test transmitter for use in combination with a radio communication apparatus, which test transmitter is capable of quantitatively measuring, as a receiver sensitivity of the radio communication apparatus, the number of correct bits in a test digital data signal carried by a radio test signal which the radio communication apparatus receives when the radio test signal has a particular electric field strength.

It is a still further object of this invention to provide a test transmitter of the type described, wherein it is unnecessary to make a test signal generator of the test transmitter generate the test digital data signal which represents an identification number specific to the radio communication apparatus.

It is a yet further object of this invention to provide a test transmitter of the type described, wherein it is possible to decrease labor and time of measurement of the receiver sensitivity of the radio communication apparatus.

Other objects of this invention will become clear as the description proceeds.

On describing the gist of an aspect of this invention, it is possible to understand that a radio communication apparatus is for receiving a radio communication signal carrying a communication digital data signal and a radio test signal carrying a test digital data signal. The radio communication apparatus includes radio digital data recovering means for recovering the communication digital data signal from the radio communication signal and the test digital data signal as a first digital data signal from the radio test signal.

According to this aspect of this invention, the above-understood radio communication apparatus is for receiving an optical test signal carrying the test digital data signal. The radio communication apparatus comprises optical digital data recovering means for recovering the test digital data signal as a second digital data signal from the optical test signal, timing pulse generating means connected to the optical digital data recovering means for generating a timing pulse signal in bit synchronism with the second digital data signal, comparing means connected to the radio and the optical digital data recovering means for comparing the first digital data signal with the second digital data signal bit by bit to successively produce bit coincidence pulses whenever the first and the second digital data signals are coincident with each other bit by bit, a first counter connected to the timing pulse generating means for counting up a first count in response to the timing pulse signal from an initial value to a predetermined threshold value to produce a count stop signal when the first count is counted up to the threshold value, and a second counter connected to the comparing means and the first counter for counting up a second count in response to the bit coincidence pulses from an initial count to an increased count until production of the count stop signal to produce a count signal which represents the increased count as a receiver sensitivity of the radio communication apparatus in relation to the communication digital data signal.

On describing the gist of a specific aspect of this invention, it is possible to understand that a radio communication apparatus is for receiving a radio communication signal carrying a communication digital data signal. The radio communication apparatus is for use in combination with a test transmitter including a test signal generator for generating a test digital data signal, and radio test signal transmitting means connected to the test signal generator for transmitting a radio test signal carrying the test digital data signal. The radio communication apparatus includes radio digital data recovering means for recovering the communication digital data signal from the radio communication signal and the test digital data signal as a receiver recovered digital data signal from the radio test signal.

According to the specific aspect of this invention, the above-understood radio communication apparatus comprises optical test signal transmitting means connected to the radio digital data recovering means for transmitting an optical test signal carrying the receiver recovered digital data signal. The test transmitter comprises optical digital data recovering means for recovering the receiver recovered digital data signal as a transmitter recovered digital data signal from the optical test signal, timing pulse generating means connected to the test signal generator for generating a timing pulse signal in bit synchronism with the test digital data signal, comparing means connected to the test signal generator and the optical data recovering means for comparing the transmitter recovered digital data signal with the test digital data signal to successively produce bit coincidence pulses whenever the test digital data signal and the transmitter recovered digital data signal are coincident with each other bit by bit, a first counter connected to the timing pulse generating means for counting up a first count in response to the timing pulse signal from an initial value to a predetermined threshold value to produce a count stop signal when the first count is counted up to the threshold value, and a second counter connected to the comparing means and the first counter for counting up a second count in response to the bit coincidence pulses from an initial count to an increased count until production of the count stop signal to produce a count signal which represents the increased count as a receiver sensitivity of the radio communication apparatus in relation to the communication digital data signal.

On describing the gist of a different aspect of this invention, it is possible to understand that a test transmitter for use in testing radio communication apparatus for receiving a radio communication signal carrying a communication digital data signal. The test transmitter includes a test signal generator for generating a test digital data signal, and radio test signal transmitting means connected to the test signal generator for transmitting a radio test signal carrying the test digital data signal. The radio communication apparatus includes radio digital data recovering means for recovering the communication digital data signal from the radio communication signal and the test digital data signal as a receiver recovered digital data signal from the radio test signal.

According to the different aspect of this invention, the above-understood test transmitter comprises optical digital data recovering means for recovering the receiver recovered digital data signal as a transmitter recovered digital data signal from an optical test signal carrying the receiver recovered digital data signal, the optical test signal being transmitted by optical test signal transmitting means which is connected to the radio digital data recovering means in the radio communication apparatus, timing pulse generating means connected to the test signal generator for generating a timing pulse signal in bit synchronism with the test digital data signal, comparing means connected to the test signal generator and the optical data recovering means for comparing the transmitter recovered digital data signal with the test digital data signal to successively produce bit coincidence pulses whenever the test digital data signal and the transmitter received digital data signal are coincident with each other bit by bit, a first counter connected to the timing pulse generating means for counting up a first count in response to the timing pulse signal from an initial value to a predetermined threshold value to produce a count stop signal when the first count is counted up to the threshold value, and a second counter connected to the comparing means and the first counter for counting up a second count in response to the bit coincidence pulses from an initial count to an increased count until production of the count stop signal to produce a count signal which represents the increased count as a receiver sensitivity of the radio communication apparatus in relation to the communication digital data signal.

DESCRIPTION OF THE PREFERRED EMBODIMENTS

Figure 1:
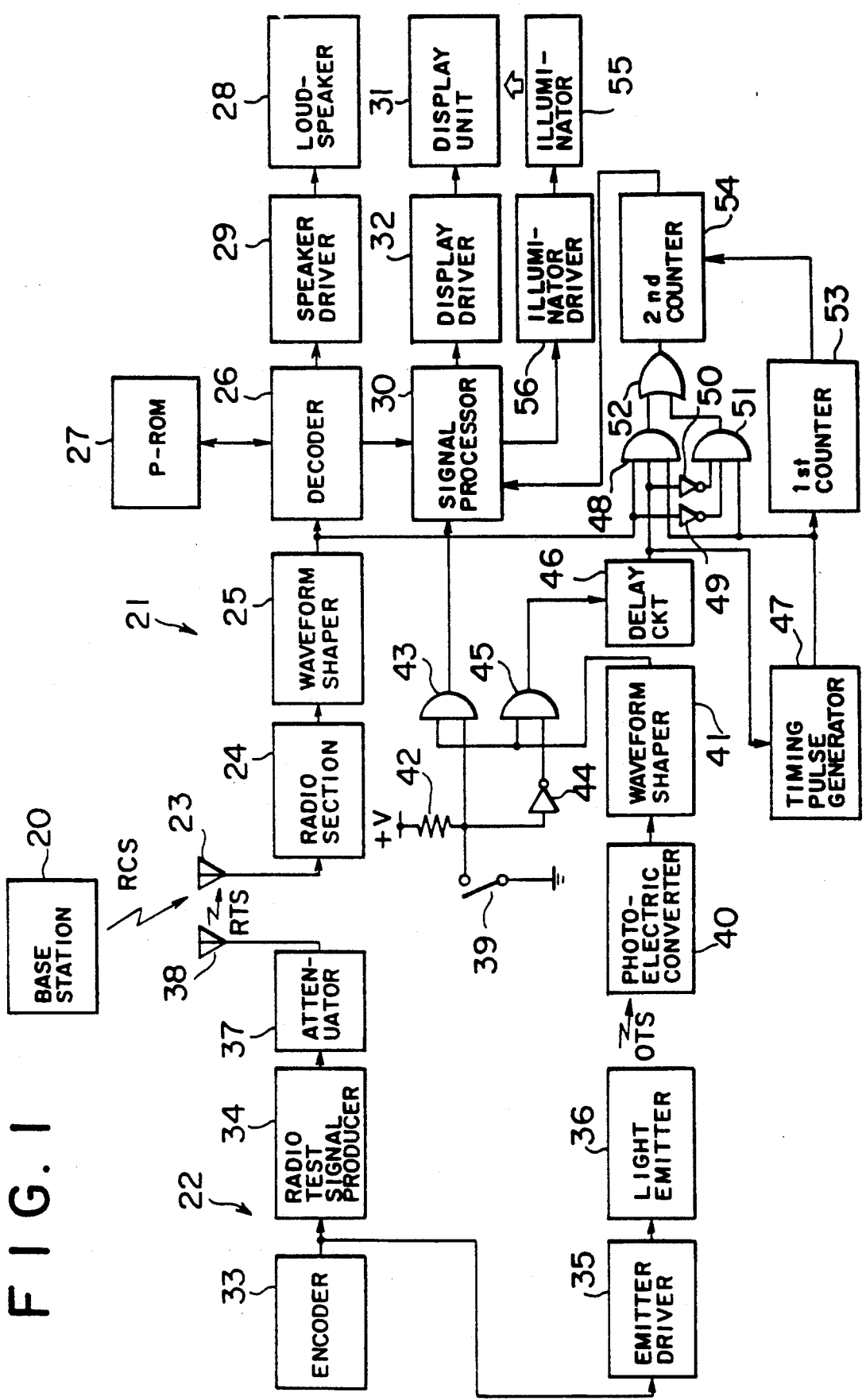
FIG. 1 is a block diagram of a combination of a test transmitter, a base station, and a radio paging receiver according to a first embodiment of this invention.

Referring to FIG. 1, a radio paging system comprises a base station 20, a radio paging receiver 21 according to a first embodiment of this invention, and other radio paging receivers (not shown) which are similar in structure and in operation to the radio paging receiver 21. The base station 20 is for transmitting a radio communication signal indicated at RCS. The radio paging receiver 21 receives and deals with the radio communication signal RCS. The radio paging receiver 21 is for use in combination with a test transmitter 22 which will later be described.

Figure 2:
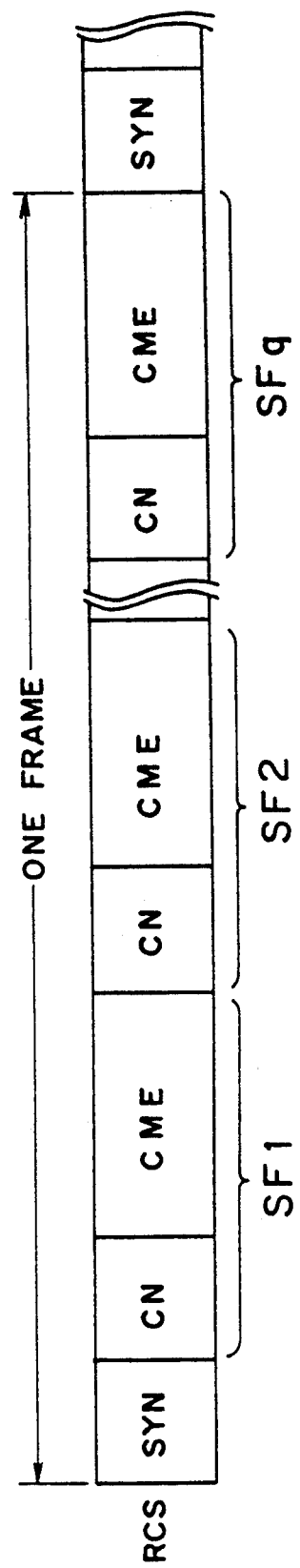
FIG. 2 is a signal format for use in describing operation of the radio paging receiver illustrated in FIG. 1.

Turning to FIG. 2, the radio communication signal RCS is illustrated. The illustrated radio communication signal RCS is a POGSAG code radio signal which is set up in CCIR recommendation 584. The radio communication signal RCS comprises a plurality of frames which are similar in frame structure to one another.

Each frame of the radio communication signal RCS carries a synchronization signal SYN and first through q-th subframes SF1 to SFq successively succeeding the synchronization signal SYN, where q represents a positive integer. The synchronization signal SYN has a predetermined number of bits and is specified by a predetermined pattern of bits.

The radio paging receiver 21 (FIG. 1) and other radio paging receivers of the radio paging system have identification or call numbers different from one another and may be grouped into first through q-th groups. The first through the q-th groups are assigned to the first through the q-th subframes SF1 to SFq of each frame, respectively. Supposing that the radio paging receiver 21 belongs to the first group, the base station 20 (FIG. 1) transmits a call number signal CN representative of the identification or call number specific to the radio paging receiver 21 and a communication message signal CME representative of a communication message directed to the radio paging receiver 21 by using the first subframe SF1. The call number signal CN has first through P-th bits, where P represents a natural number greater than one. The communication message signal CME has a preselected number of bits. Each of the synchronization signal SYN, the call number signal CN, and the communication message signal CME consists of Bose-Chaudhuri-Hocquenghem (BCH) codes.

A combination of the synchronization signal SYN, the call number signal CN, and the communication message signal CME will be referred to herein as a communication digital data signal. The communication digital data signal is carried by the radio communication signal RCS.

Turning back to FIG. 1 with reference to FIG. 2 continued, description will be made as regards operation of the radio paging receiver 21 when the paging receiver 21 receives the radio communication signal RCS. The radio communication signal RCS is picked up by an antenna 23 and supplied to a radio section 24. The radio section 24 converts or demodulates the radio communication signal RCS into a baseband or demodulated signal. Connected to the radio section 24, a first waveform shaper 25 shapes the demodulated signal into a shaped signal of a digital waveform. The shaped signal has the communication digital data signal (namely, a combination of the synchronization signal SYN, the call number signal CN, and the communication message signal CME).

Thus, a combination of the antenna 23, the radio section 24, and the first waveform shaper 25 serves as a radio digital data recovering section. The radio digital data recovering section (23, 24, 25) is for recovering the communication digital data signal from the radio communication signal RCS.

A decoder 26 is supplied with the communication digital data signal and detects the synchronization signal SYN in order to establish bit synchronization and frame synchronization. After the bit synchronization and frame synchronization are established, the decoder 26 cooperates with a P-ROM (programmable read-only memory) 27 which preliminarily memorizes first through P-th bits of a directory number signal representative of the identification number specific to the radio paging receiver 21. That is, the decoder 26 compares the call number signal CN with the directory number signal bit by bit.

When the decoder 26 detects coincidence between the bits of the call number signal CN with the directory number signal, the decoder 26 sends a speaker drive signal to a loudspeaker 28 through a speaker driver 29 to make the loudspeaker 28 generate a call tone indicative of a call to the radio paging receiver 21 a predetermined time duration. Simultaneously, the decoder 26 sends the communication message signal CME to a signal processor 30. Responsive to the communication message signal CME, the signal processor 30 makes the display unit 31 visually display the communication message of the communication message signal CME through a display driver 32. The display unit 31 is, for example, a liquid crystal display (LCD).

Thus, the decoder 26 serves, in cooperation with the P-ROM 27, the speaker driver 29, the signal processor 30, and the display driver 32 as a data processing section connected to the radio digital data recovering section (23, 24, 25). The data processing section (26, 27, 29, 30, 32) processes the communication digital data signal into a processed signal (namely, the speaker drive signal and the communication message signal CME). A combination of the loudspeaker 28 and the display unit 31 serves as an announcing section connected to the data processing section (26, 27, 29, 30, 32). The announcing section (28, 29) carries out an announcing operation of production of the processed data signal in response to the processed data signal.

Figure 3:
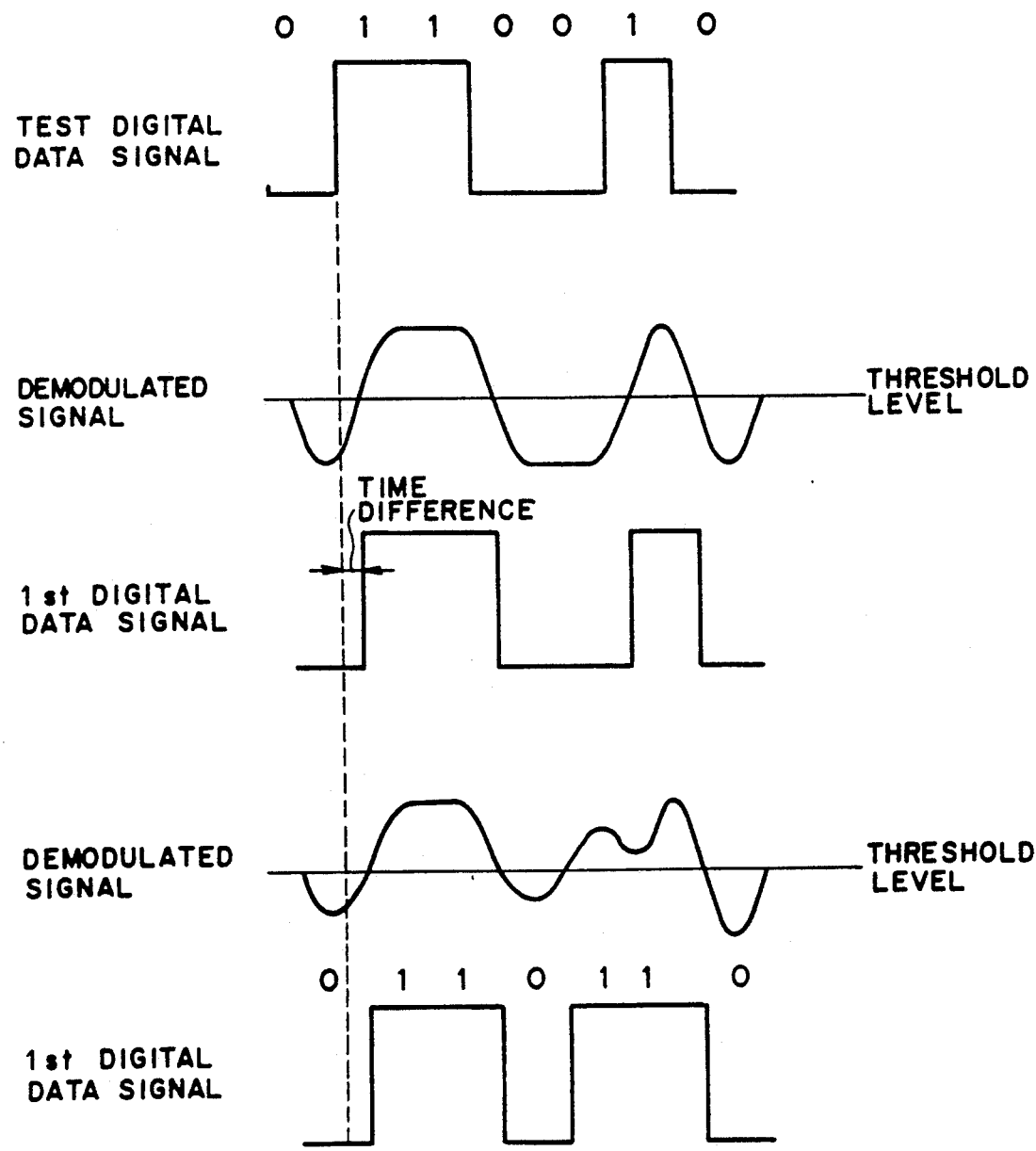
FIG. 3 is a time chart for use in describing operation of the radio paging receiver illustrated in FIG. 1.

Turning to FIG. 3 with reference to FIG. 1 continued, description will proceed to the test transmitter 22. The test transmitter 22 is for use in testing the radio paging receiver 21. The test transmitter 22 is usually carried by a maintenance engineer who is in charge of maintenance service of the radio paging system. The test transmitter 22 is for transmitting a radio test signal which is indicated at RTS and which carries a test digital data signal. The test transmitter 22 is furthermore for transmitting an optical test signal indicated at OTS. The optical test signal OTS carries the test digital data signal like the radio test signal RTS.

The test transmitter 22 has an encoder 33 which generates the test digital data signal having logic "1" and "0" levels. More specifically, the test digital data signal successively comprises first through N-th bits, where N represents a first integer which is greater than one.

The test digital data signal is illustrated in FIG. 3 along a first or top line. The illustrated test digital data signal successively comprises logic "0", "1", "1", "0", "0", "1", and "0" levels.

In FIG. 1, the encoder 33 simultaneously supplies the test digital data signal to a radio test signal producer 34 and to an emitter driver 35 for driving a light emitter 36 which is, for example, an LED (light-emitting diode), a laser diode, or the like.

When supplied with the test digital data signal, the radio test signal producer 34 produces the radio test signal RTS carrying the test digital data signal. The radio test signal RTS is transmitted through an attenuator 37 and an antenna 38.

When supplied with the test digital data signal, the emitter driver 35 produces an on-off drive signal which indicates on and off when the test digital data signal has logic "1" and "0" levels, respectively. Responsive to the on-off drive signal, the light emitter 36 emits or transmits a flicker light which indicates logic "1" and "0" levels of the test digital data signal as the optical test signal OTS carrying the test digital data signal. More specifically, the optical test signal OTS is controlled or modulated by the test digital data signal to form the flicker light which indicates logic "1" and "0" levels of the test digital data signal.

With reference to FIGS. 1 and 3 continued, description will be made as regards operation of the radio paging receiver 21 when the radio paging receiver 21 is tested by the test transmitter 22. In this event, the maintenance engineer puts a switch 39 in an on state and makes the test transmitter 22 transmit the radio and the optical test signals RTS and OTS.

The radio test signal RTS is picked up by the antenna 23 and supplied to the radio section 24. The radio section 24 converts or demodulates the radio test signal RTS into a baseband or demodulated signal. The demodulated signal is illustrated in FIG. 3 along a second line. The illustrated demodulated signal is demodulated by the radio section 24 when the radio test signal RTS has a high electric field strength.

In FIG. 1, the first waveform shaper 25 shapes the demodulated signal into a first shaped signal of a digital waveform by comparing the demodulated signal with a predetermined threshold level illustrated in FIG. 3 along the second line. The first shaped signal will be referred to as a first digital data signal and is illustrated in FIG. 3 along a third line. The first digital data signal has a high level when the demodulated signal has an amplitude larger than the threshold level. When the demodulated signal has another amplitude which is not larger than the threshold level, the first digital data signal has a low level. The illustrated first digital data signal is equivalent in waveform to the test digital data signal produced by the encoder 33. That is, the radio paging receiver 21 correctly receives the test digital data signal with the test digital data signal subjected to no bit error. However, a time difference or delay between the test digital data signal and the first digital data signal inevitably produces due to a circuit delay of the radio section 24, the first waveform shaper 25, and so on.

As illustrated in FIG. 3 along a fourth line, the demodulated signal is demodulated by the radio section 24 when the radio test signal RTS has a low electric field strength. In this case, the first waveform shaper 25 produces the first digital data signal illustrated in FIG. 3 along the fifth line. The illustrated first digital data signal successively comprises logic "0", "1", "1", "0", "1", "1", and "0" levels. That is, the radio paging receiver 21 receives the test digital data signal with the test digital data signal subjected to a bit error. In the illustrated example, the bit error occurs at a fifth bit of the first digital data signal.

Thus, the radio digital data recovering section (23, 24, 25) is furthermore for recovering the test digital data signal as the first digital data signal from the radio test signal RTS.

A photoelectric converter 40 converts the optical test signal OTS into a converted or demodulated signal. Connected to the photoelectric converter 40, a second waveform shaper 41 shapes the converted signal into a second shaped signal of digital waveform that is equivalent to the test digital data signal. Inasmuch as the optical test signal OTS has no relation to the electric field strength, the optical test signal OTS can be received with the test digital data signal subjected to no bit error. The second shaped signal has a waveform substantially equivalent to the shaped signal illustrated in FIG. 3 along the third line.

In FIG. 1, the switch 39 has negative and positive terminals connected to the earth or ground directly and a voltage source through a resistor 42, respectively. The voltage source is indicated at +V and gives a positive voltage to the positive terminal. The negative terminal is supplied with an earth voltage. It will be assumed that the positive and the earth voltages corresponding to a logic "1" level and a logic "0" level.

The switch 39 is usually put in an off state. That is, the switch 39 is put in the off state when the radio and the optical test signals RTS and OTS are not transmitted by the test transmitter 22. In this case, a first AND circuit 43 is supplied with the logic "1" level through the resistor 42. Inasmuch as an inverter 44 is supplied with the logic "1" level through the resistor 42 and inverts the logic "1" level into the logic "0" level, a second AND circuit 45 is supplied with the logic "0" level. The first AND circuit 43 thereby delivers to the signal processor 30 an output signal of the second waveform shaper 41. In this event, the signal processor 30 operates in the manner which will later be described.

Figure 4:
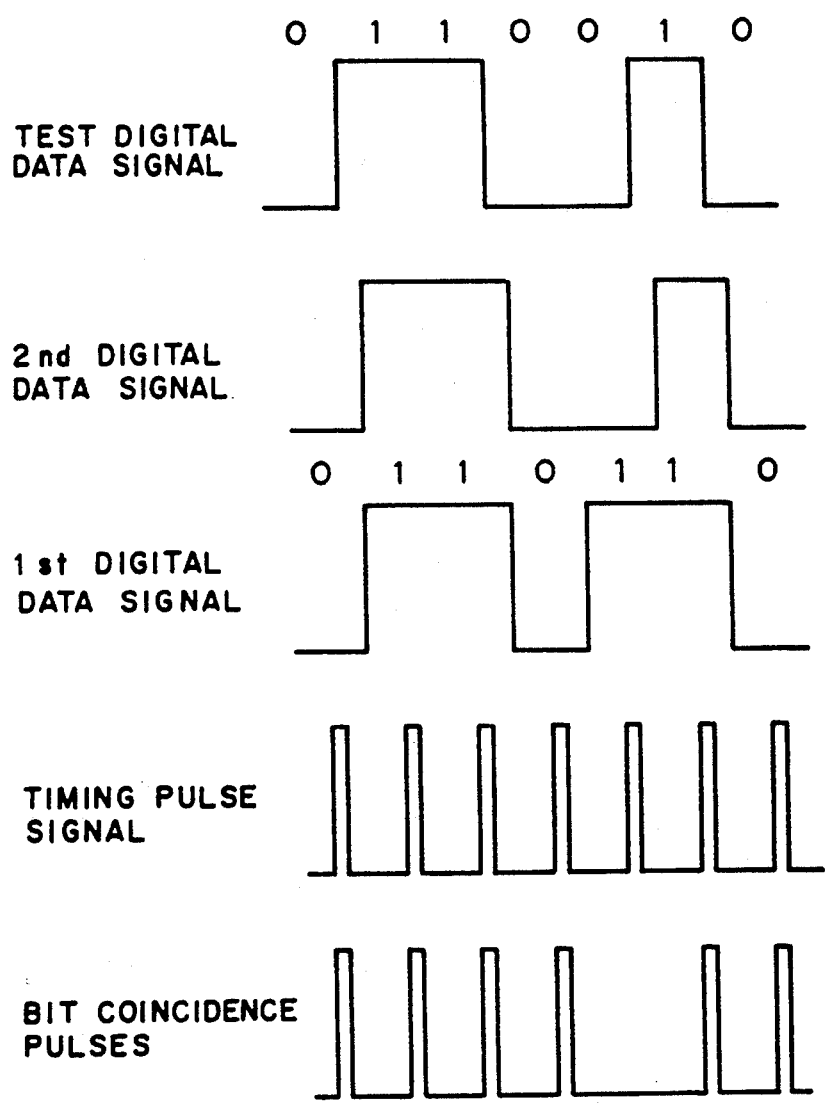
FIG. 4 is another time chart for use in describing operation of the radio paging receiver illustrated in FIG. 1.

Turning to FIG. 4 with reference to FIG. 1 continued, description will proceed to a case where the switch 39 is put in the on state. As mentioned above, the switch 39 is put in the on state by the maintenance engineer when the radio paging receiver 21 is tested by the test transmitter 22. In this case, the earth voltage (namely, the logic "0" level) is supplied to the inverter 44 through the switch 39. Inasmuch as the inverter 44 supplies the second AND circuit 45 with the logic "1" level, the second AND circuit 45 supplies a delay circuit 46 with the second shaped signal produced by the second waveform shaper 41. The delay circuit 46 gives the second shaped signal of the second waveform shaper 41 a predetermined delay so that the first bit of the shaped signal of the second waveform shaper 41 coincides with the first bit of the first digital data signal produced by the first waveform shaper 25. The delay circuit 46 thereby produces a delayed signal which will be referred to as a second digital data signal.

Thus, a combination of the photoelectric converter 40, the second waveform shaper 41, the switch 39, the voltage source +V, the resistor 42, the inverter 44, the second AND circuit 45, and the delay circuit 46 is operable as an optical digital data recovering section. The optical digital data recovering section (39-42, +V, 44-46) recovers the test digital data signal as the second digital data signal from the optical test signal OTS.

In FIG. 4, the test digital data signal produced by the encoder 33 is illustrated along a first line. First through seventh bits of the illustrated test digital data signal have the logic "0", "1", "1", "0", "0", "1", and "0" levels, respectively.

As illustrated in FIG. 4 along a second line, the second digital data signal produced by the delay circuit 46 of the optical digital data recovering section has a waveform which is substantially equivalent to the test digital data signal. This is because the optical test signal OTS can be received with the test digital data signal subjected to no bit error as mentioned above.

The first digital data signal produced by the first waveform shaper 25 of the radio digital data recovering section (23, 24, 25) is illustrated in FIG. 4 along a third line. The illustrated first digital data signal is equivalent to the first digital data signal illustrated in FIG. 3 along the fifth line and has the bit error which occurs at the fifth bit of the first digital data signal as mentioned above.

In FIG. 1, a timing pulse generator 47 is connected to the delay circuit 46 of the optical digital data recovering section (39-42, +V, 44-46). The timing pulse generator 47 generates a timing pulse signal in bit synchronism with the second digital data signal. More specifically, the timing pulse generator 47 successively generates first through N-th timing pulses collectively as the timing pulse signal in bit synchronism with the first through the N-th bits of the second digital data signal. The timing pulse signal is illustrated in FIG. 4 along a fifth line.

In FIGS. 1 and 4, a third AND circuit 48 is directly connected to the first waveform shaper 25, the delay circuit 46, and the timing pulse generator 47. The third AND circuit 48 successively produces first coincidence pulses whenever n-th bits of the first and the second digital data signals and an n-th timing pulse are coincident with one another, where n consecutively varies from 1 to N. In this event, each of the first coincidence pulses is produced when the n-th bit of the first digital data signal and the n-th bit of the second digital data signal have the logic "1" level in common.

Connected to the first waveform shaper 25 and the delay circuit 46 through inverters 49 and 50, respectively, and connected to the timing pulse generator 47 directly, a fourth AND circuit 51 successively produces second coincidence pulses whenever inverted bits of the n-th bits of the first and the second digital data signals and the n-th timing pulse are coincident with one another. In this event, each of the second coincidence pulses is produced when the n-th bit of the first digital data signal and the n-th bit of the second digital data signal have the logic "0" level in common.

Connected to the third and the fourth AND circuits 48 and 51, an OR circuit 52 produces the first and the second coincidence pulses as bit coincidence pulses. In FIG. 4, the bit coincidence pulses are illustrated along a fifth line.

Thus, a combination of the third and the fourth AND circuits 48 and 51, the inverters 49 and 50, and the OR circuit 52 serves as a comparing section connected to the radio digital data recovering section (23, 24, 25) and the optical digital data recovering section (39-42, 44, 45, +V). The comparing section (48-52) compares the first digital data signal with the second digital data signal bit by bit and successively produces the bit coincidence pulses whenever the first and the second digital data signals are coincident with each other bit by bit. More specifically, the comparing section (48-52) compares the first through the N-th bits of the first digital data signal with the first through the N-th bits of the second digital data signal, respectively, and successively produces the bit coincidence pulses whenever n-th bits of the first and the second digital data signals are coincident with each other, where n consecutively varies from 1 to N.

In FIG. 1, a first counter 53 is connected to the timing pulse generator 47. The first counter 53 counts up a first count in response to the timing pulse signal from an initial value to a predetermined threshold value and produces a count stop signal when the first count is counted up to the threshold value. The threshold value is greater than the initial value by a second integer M which is greater than one and is not greater than the first integer N. More specifically, the first counter 53 counts up the first count to at least a part of the first through the N-th timing pulses and produces the count stop signal when the first count increases up to the threshold value.

Connected to the OR circuit 52 of the comparing section (48-52) and the first counter 53, a second counter 54 counts up a second count in response to the bit coincidence pulses from an initial count equal to zero to an increased count until production of the count stop signal and produces a count signal which represents the increased count as a receiver sensitivity of the radio paging receiver 21 in relation to the communication digital data signal. More specifically, the second counter 54 counts up the second count in response to the bit coincidence pulses which are produced when n consecutively varies from 1 towards N. The second counter 54 produces the count signal.

Connected to the second counter 54, the signal processor 30 makes the display unit 31 display, as the receiver sensitivity of the radio paging receiver 21, the increased count of the count signal through the display driver 32. Supposing that the second integer M is equal to 100, the display unit 31 displays the number of bit coincidence pulses produced during a time duration corresponding to 100 timing pulses. In this case, the display unit 31 displays percentage of the number of correct or nonerroneous bits in the test digital data signal carried by the radio test signal RTS which the radio paging receiver 21 receives when the radio test signal RTS has a particular electric field strength.

Thus, a combination of the signal processor, the display driver 32, and the display unit 31 is operable as an indicating section connected to the second counter 54. The indicating section (30, 31, 32) indicates, as the receiver sensitivity of the radio paging receiver 21, the increased count represented by the count signal.

In FIG. 1, the radio paging receiver 21 further comprises an illuminator 55, such as a lamp, connected to the signal processor 30 through an illuminator driver 56. The illuminator 55 illuminates the display unit 31 by illuminating light when the illuminator 55 is driven by the signal processor 30. As mentioned above, the signal processor 30 is supplied with the output signal of the second waveform shaper 41 through the AND circuit 43 when the switch 39 is put in the off state. Inasmuch as the maintenance engineer does not make the test transmitter 22 transmit the optical test signal OTS when the switch 39 is put in the off state, the photoelectric converter 40 is not supplied with the optical test signal OTS but supplied with environment light of the paging receiver 21. When the environment light has a low intensity or brightness, the output signal of the second waveform shaper 41 has a logic "1" level. When the environment light has a high intensity or brightness, the output signal of the second waveform shaper 41 has a logic "0" level. That is, when environment of the radio paging receiver 21 becomes dark, the output signal of the second waveform shaper 41 has a logic "1" level. On condition that the signal processor 30 receives the output signal of the logic "1" level from the second waveform shaper 41 through the first AND circuit 43 (namely, the environment of the radio paging receiver 21 becomes dark) when the signal processor 30 drives the display unit 31 so as to make the display unit 31 display the communication message CME (FIG. 2) recovered by the decoder 26, the signal processor 30 drives the illuminator 55 to make the illuminator 55 illuminate the display unit 31 by the illuminating light.

Figure 5:
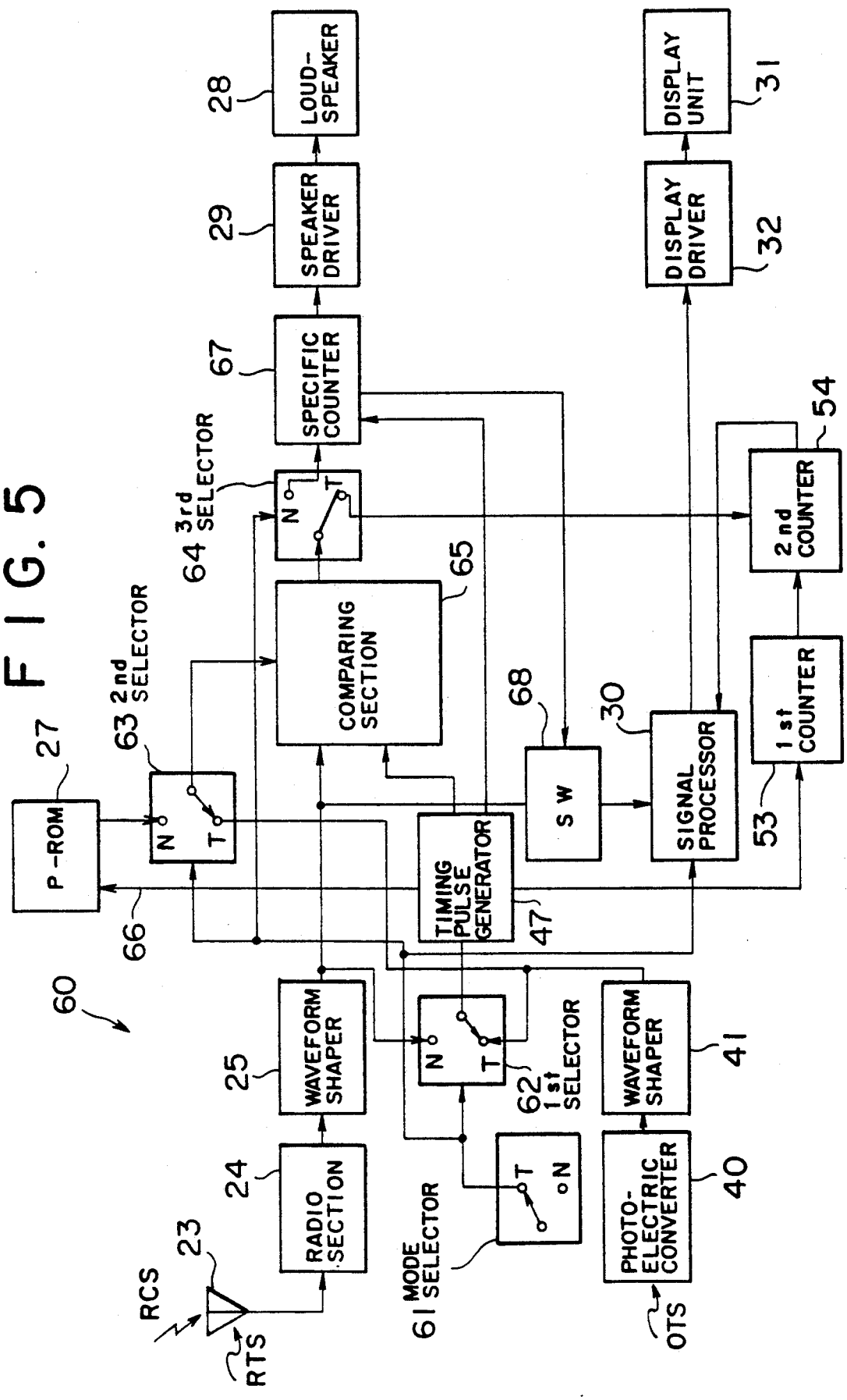
FIG. 5 is a block diagram of a radio paging receiver according to a second embodiment of this invention.

Turning to FIG. 5, description will proceed to a radio paging receiver 60 according to a second embodiment of this invention. The radio paging receiver 60 comprises similar parts designated by like reference numerals. The radio paging receiver comprises a mode selector 61 which selects a normal and a test mode of operation. The normal and the test mode are indicated at N and T, respectively. First through third selectors 62, 63, and 64 are connected to the mode selector 61. Each of the first through the third selectors 62 to 64 selects a normal mode N of operation when the mode selector 61 selects the normal mode N. When the mode selector 61 selects the test mode T, each of the first through the third selectors 62 to 64 selects a test mode T of operation.

A combination of the mode selector 61 and the first through the third selectors 62 to 64 will be referred to as a mode selecting section for selecting the normal and the test mode of operation.

It will be assumed that the maintenance engineer makes the mode selector 61 select the test mode T and that the test transmitter 22 transmits the radio and the optical test signals RTS and OTS. In this case, the first through the third selectors 62 to 64 selects the test mode T.

In the test mode T, the timing pulse generator 47 is connected to the second waveform shaper 41 of the optical digital data recovering section (40, 41) through the first selector 62 of the mode selecting section (61-64). As a result, the timing pulse generator 47 successively generates the first through the N-th timing pulses in bit synchronism with the first through the N-th bits of the second digital data signal recovered by the second waveform shaper 41 of the optical digital data recovering section (40, 41).

A comparing section 65 is connected to the first waveform shaper 25 of the radio digital data recovering section (23-25) directly and to the timing pulse generator 47 directly. The comparing section 65 is furthermore connected to the second waveform shaper 41 of the optical digital data recovering section (40, 41) through the second selector 63 of the mode selecting section (61-64) in the test mode T. Like the comparing section (48-52) of the radio paging receiver 21 of FIG. 1, the comparing section 65 compares, in the test mode T, the first through the N-th bits of the first digital data signal from the first waveform shaper 25 with the first through the N-th bits of the second digital data signal from the second waveform shaper 41, respectively, and successively produces the bit coincidence pulses whenever the n-th bits of the first and the second digital data signals are coincident with each other, where n consecutively varies from 1 to N.

The second counter 54 is connected to the comparing section 65 through the third selector 64 of the mode selecting section (61-64) in the test mode T. Like in the radio paging receiver 21, the second counter 54 counts up the second count until production of the count stop signal from the first counter 53 in response to the bit coincidence pulses which are produced when n consecutively varies from 1 to N. The second counter 54 produces the count signal which represents the increased count as a receiver sensitivity of the radio paging receiver 60.

Connected to the mode selector 61 and responsive to the count signal, the signal processor 30 makes the display unit 31 display the increased count of the count signal as the receiver sensitivity of the radio paging receiver 60 in the test mode T.

It will be assumed that the mode selector 61 selects the normal mode N and that the radio paging receiver 60 receives the radio communication signal RCS instead of the radio and the optical test signals RTS and OTS. In this case, the first through the third selectors 62 to 64 selects the normal mode N.

As mentioned above, the communication digital data signal is carried by the radio communication signal RCS and comprises the call number signal CN (FIG. 2) having the first through the P-th bits.

The P-ROM 27 produces a specific digital data signal successively comprising first through P-th bits in synchronism with the first through the P-th bits of the communication digital data signal. The first through the P-th bits of the specific digital data signal collectively represents the identification number specific to the radio paging receiver 60.

In the normal mode N, the timing pulse generator 47 is connected to the first waveform shaper 25 of the radio digital data recovering section (23-25) through the first selector 62 of the mode selecting section (61-64) and to the P-ROM 27 through a signal supply lead 66. As a result, the timing pulse generator 47 successively generates first through P-th timing pulses in bit synchronism with the first through the P-th bits of the communication digital data signal recovered by the first waveform shaper 25 of the radio digital data recovering section (23-25).

The comparing section 65 is connected to the P-ROM 27 through the second selector 63 of the mode selecting section (61-64) and is connected to the first waveform shaper 25 of the radio digital data recovering section (23-25) directly and to the timing pulse generator 47 directly. In the manner similar to operation of the comparing section 65 in the test mode T, the comparing section 65 compares, in the normal mode N, the first through the P-th bits of the communication digital data signal from the first waveform shaper 25 with the first through the P-th bits of the specific digital data signal from the P-ROM 27, respectively, and successively produces output coincidence pulses whenever p-th bits of the communication and the specific digital data signals are coincident with each other, where p consecutively varies from 1 to p.

More specifically, the P-ROM 27 memorizes first through P-th bits of a directory number signal representative of the identification number specific to the radio paging receiver 60 like in the radio paging receiver 21 of FIG. 1. The signal supply lead 66 is connected to the timing pulse generator 47 and to the P-ROM 27 for supplying the first through the P-th timing pulses to the P-ROM 27 to make the P-ROM 27 produce the first through the P-th bits of the directory number signal in bit synchronism with the first through the P-th timing pulses as the first through the P-th bits of the specific digital data signal.

In the normal mode N, a specific counter 67 is connected to the comparing section 65 through the third selector 64 of the mode selecting section (61-64) and to the timing pulse generator 47 directly. With reference to the first through the P-th timing pulses in bit synchronism with the first through the P-th bits of the communication digital data signal, the specific counter 67 counts the output coincidence pulses produced in response to the first through the P-th bits of the specific digital data signal. The specific counter 67 thereby produces a number coincidence signal which indicates that the first through the P-th bits of the communication digital data signal represents the identification number specific to the radio paging receiver 60.

The specific counter 57 supplies the number coincidence signal to the loudspeaker 28 through the speaker driver 29 as the speaker drive signal to make the loudspeaker 28 generate the call tone indicative of a call to the radio paging receiver 60 a predetermined time duration.

The specific counter 57 supplies the number coincidence signal to a switching circuit 68 labelled "SW". In response to the number coincidence signal, the switching circuit 68 sends to the signal processor 30 the communication message signal CME (FIG. 2) which follows the call number signal CN. Responsive to the communication message signal CMR, the signal processor 30 makes the display unit 31 display the communication message of the communication message signal CME through the display driver 32.

Figure 6:
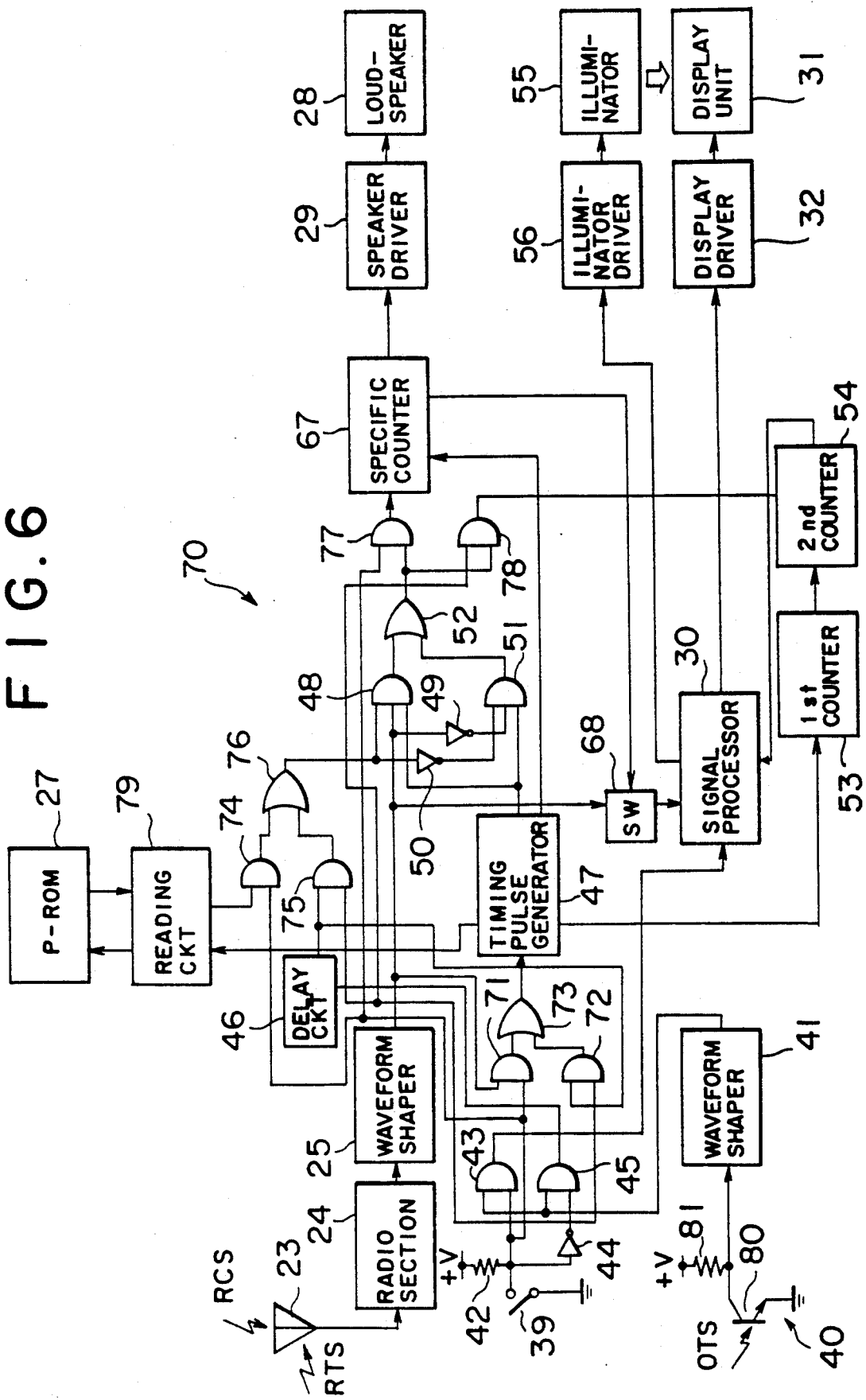
FIG. 6 is a block diagram of a radio paging receiver according to a third embodiment of this invention.

Turning to FIG. 6, description will proceed to a radio paging receiver 70 according to a third embodiment of this invention. The radio paging receiver 70 comprises similar parts designated by like reference numerals.

Like in the radio paging receiver of FIG. 1, the switch 39 is usually put in the off state and is put in the on state when the radio paging receiver 70 is tested. The switch 39 corresponds to the mode selector 61 of FIG. 5 and operates in the manner similar to the mode selector 61.

In the radio paging receiver 70, the first through the third selectors 62 to 64 and the comparing section 65 of FIG. 5 are implemented or constituted by logical circuits in the following manner. A combination of AND circuits 71 and 72 and an OR circuit 73 constitutes the first selector 62 of FIG. 5 and operates in the manner similar to the first selector 62 of FIG. 5. Another combination of AND circuits 74 and 75 and another OR circuit 76 constitutes the second selector 63 of FIG. 5 and operates in the manner similar to the second selector 63 of FIG. 5. A different combination of AND circuits 77 and 78 constitutes the third selector 64 of FIG. 5 and operates in the manner similar to the third selector 64 of FIG. 5. A combination of the AND circuits 48 and 51, the inverters 49 and 50, and the OR circuit 52 constitutes the comparing section 65 of FIG. 5 and operates in the manner similar to those of the radio paging receiver 21 of FIG. 1.

A reading circuit 79 corresponds to the signal supply lead 66 of FIG. 5 and operates in the manner similar to the signal supply lead 66 of FIG. 5. That is, the reading circuit 79 is connected to the timing pulse generator 47 and the P-ROM 27 and supplies the first through the P-th timing pulses to the P-ROM 27 to read from the P-ROM 27 the first through the P-th bits of the directory number signal representative of the identification number of the radio paging receiver 70 in bit synchronism with the first through the P-th timing pulses as the first through the P-th bits of the specific digital data signal and to deliver the first through the P-th bits of the specific digital data signal to the AND circuit 74 corresponding to a part of the second selector 63 of FIG. 5.

In FIG. 6, the photoelectric converter 40 is implemented or constituted by a phototransistor 80 having a collector and an emitter connected to the earth or ground. The collector is connected to the voltage source +V through a resistor 81. A collector voltage of the collector of the phototransistor 80 is supplied to the second waveform shaper 41. The photoelectric converter 40 operates in the manner similar to that of FIG. 1.

Figure 7:
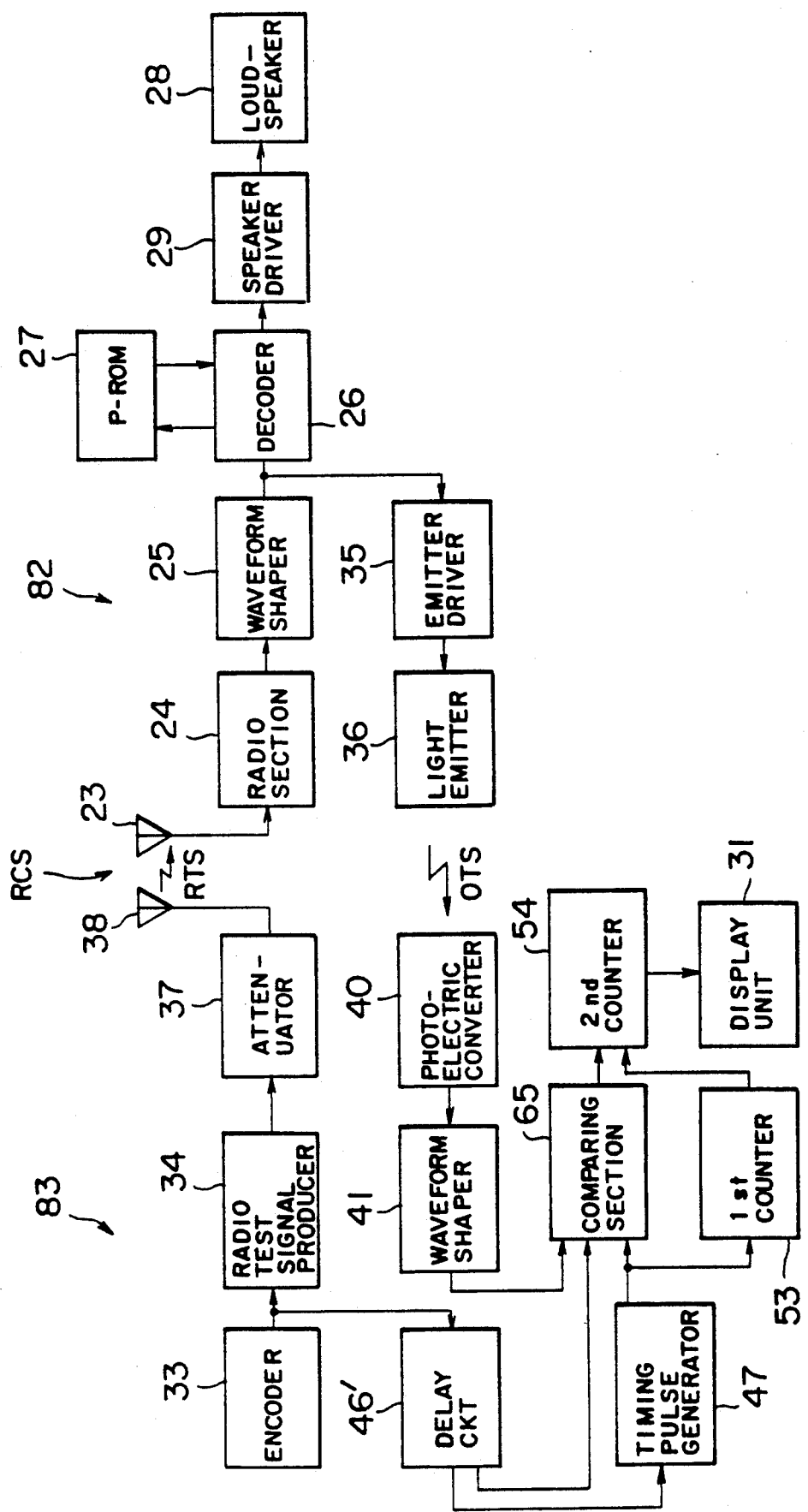
FIG. 7 is a block diagram of a combination of a radio paging receiver according to a fourth embodiment of this invention and a test transmitter according to a fifth embodiment of this invention.

Turning to FIG. 7, description will proceed to a radio paging receiver 82 according to a fourth embodiment of this invention and a test transmitter 83 according to a fifth embodiment of this invention. Each of the radio paging receiver 82 and the test transmitter 83 comprises similar parts designated by like reference numerals.

The test transmitter 83 has the encoder 33 which generates the test digital data signal. Connected to the encoder 33, the radio test signal producer 34 produces the radio test signal RTS carrying the test digital data signal. The radio test signal is transmitted through the attenuator 37 and the antenna 38.

Thus, a combination of the radio test signal producer 34, the attenuator 37, and the antenna 38 serves as a radio test signal transmitting section. The radio test signal transmitting section (34, 37, 38) transmits the radio test signal RTS carrying the test digital data signal.

The radio paging receiver 82 has the radio digital data recovering section (23, 24, 25) recovers the communication digital data signal from the radio communication signal CMS and the test digital data signal as a receiver recovered digital data signal from the radio test signal RTS.

The radio paging receiver 82 comprises the emitter driver 35 connected to the first waveform shaper 25 of the radio digital data recovering section (23, 24, 25). Supplied with the receiver recovered digital data signal from the first waveform shaper 25 of the radio digital data recovering section (23, 24, 25), the emitter driver drives the light emitter 36 to make the light emitter 36 transmit the optical test signal OTS carrying the receiver recovered digital data signal.

Thus, a combination of the emitter driver 35 and the light emitter 36 is operable as an optical test signal transmitting section connected to the radio digital data recovering section. The optical test signal transmitting section transmitting the optical test signal OTS carrying the receiver recovered digital data signal.

The test transmitter 83 comprises the photoelectric converter 40 supplied with the optical test signal OTS carrying the receiver recovered digital data signal and the second waveform shaper 41 which produces the receiver recovered digital data signal. A combination of the photoelectric converter 40 and the second waveform shaper 41 serves as an optical digital data recovering section. The optical digital data recovering section (40, 41) recovers the receiver recovered digital data signal as a transmitter recovered digital data signal from the optical test signal OTS.

A delay circuit 46' is supplied with the test digital data signal from the encoder 33. The delay circuit 46' gives the test digital data signal a predetermined delay so that a first bit of the test digital data signal of the encoder 33 coincides with a first bit of the transmitter recovered digital data signal produced by the second waveform shaper 41. The delay circuit 46' thereby produces a delayed test digital data signal.

Thus, a combination of the encoder 33 and the delay circuit 46' serves as a test signal generator. The test signal generator (33, 46') generates the test digital data signal and the delayed test digital data signal.

The timing pulse generator 47 is connected to the delay circuit 46' and generates a timing pulse signal in bit synchronism with the delayed test digital data signal.

The comparing section 65 is connected to the delay circuit 46' of the test signal generator (33, 46'), the optical data recovering section (40, 41), and the delay circuit 46'. Like in the radio paging receiver 21 of FIG. 1, the comparing section 65 compares the transmitter recovered digital data signal with the delayed test digital data signal to successively produce bit coincidence pulses whenever the delayed test digital data signal and the transmitter received digital data signal are coincident with each other bit by bit.

The first counter 53 is connected to the timing pulse generator 47 and counts up the first count in response to the timing pulse signal from the initial value to the predetermined threshold value to produce the count stop signal when the first count is counted up to the threshold value.

The second counter 54 is connected to the comparing section 65 and the first counter 53 and counts up the second count in response to the bit coincidence pulses from the initial count to the increased count until production of the count stop signal to produce the count signal which represents the increased count as a receiver sensitivity of the radio paging receiver 82 in relation to the communication digital data signal RCS.

Connected to the second counter 54, the display unit 31 displays the increased count represented by the count signal as the receiver sensitivity of the radio paging receiver 82.

What is claimed is:

1. A radio communication apparatus for receiving a radio communication signal carrying a communication digital data signal and a radio test signal carrying a test digital data signal,
    said radio communication apparatus including:
        radio digital data recovering means for recovering said communication digital data signal from said radio communication signal and said test digital data signal as a first digital data signal from said radio test signal;
    wherein:
        said radio communication apparatus is for receiving an optical test signal carrying said test digital data signal;
    said radio communication apparatus comprising:
        optical digital data recovering means for recovering said test digital data signal as a second digital data signal from said optical test signal;
        timing pulse generating means connected to said optical digital data recovering means for generating a timing pulse signal in bit synchronism with said second digital data signal;
        comparing means connected to said radio and said optical digital data recovering means for comparing said first digital data signal with said second digital data signal bit by bit to successively produce bit coincidence pulses whenever said first and said second digital data signals are coincident with each other bit by bit;
        a first counter connected to said timing pulse generating means for counting up a first count in response to said timing pulse signal from an initial value to a predetermined threshold value to produce a count stop signal when said first count is counted up to said threshold value; and
        a second counter connected to said comparing means and said first counter for counting up a second count in response to said bit coincidence pulses from an initial count to an increased count until production of said count stop signal to produce a count signal which represents said increased count as a receiver sensitivity of said radio communication apparatus in relation to said communication digital data signal.

2. A radio communication apparatus as claimed in claim 1, further comprising:
    data processing means connected to said radio digital data recovering means for processing said communication digital data signal into a processed data signal; and
    announcing means connected to said data processing means for announcing production of said processed data signal in response to said processed data signal.

3. A radio communication apparatus as claimed in claim 1, said test digital data signal successively comprising first through N-th bits, where N represents a first integer which is greater than one, said threshold value being greater than said initial value by a second integer which is greater than one and is not greater than said first integer, wherein:
    said timing pulse generating means is for successively generating first through N-th timing pulses collectively as said timing pulse signal in bit synchronism with the first through the N-th bits of said second digital data signal;
    said comparing means being for comparing the first through the N-th bits of said first digital data signal with the first through the N-th bits of said second digital data signal, respectively, to successively produce said bit coincidence pulses whenever n-th bits of said first and said second digital data signals are coincident with each other, where n consecutively varies from 1 to N;
    said first counter being for counting up said first count in response to at least a part of said first through said N-th timing pulses to produce said count stop signal when said first count increases up to said threshold value;
    said second counter being for counting up said second count until production of said count stop signal in response to the bit coincidence pulses which are produced when n consecutively varies from 1 towards N, said second counter producing said count signal.

4. A radio communication apparatus as claimed in claim 3, said radio communication apparatus further comprising mode selecting means for selecting a normal mode and a test mode of operation, wherein:

said timing pulse generating means is connected to said mode selecting means in said test mode to successively generate said first through said N-th timing pulses;

said comparing means being connected to said mode selecting means to compare in said test mode the first through the N-th bits of said first digital data signal with the first through the N-th bits of said second digital data signal, respectively, to successively produce said bit coincidence pulses whenever the n-th bits of said first and said second digital data signals are coincident with each other;

said second counter being connected to said mode selecting means in said test mode to count up said second count until production or said count stop signal in response to the bit coincidence pulses which are produced when n consecutively varies from 1 towards N, said second counter producing said count signal.

5. A radio communication apparatus as claimed in claim 4, said communication digital data signal successively comprising first through P-th bits, where P represents a natural number which is greater than one, said radio communication apparatus further comprising:

memory means for producing a specific digital data signal successively comprising first through P-th bits in bit synchronism with the first through the P-th bits of said communication digital data signal, the first through the P-th bits of said specific digital data signal collectively representing an identification number specific to said radio communication apparatus;

wherein:

said timing pulse generating means is connected to said radio digital data recovering means and said memory means in said normal mode to successively generate first through P-th timing pulses in bit synchronism with the first through the P-th bits of said communication digital data signal;

said comparing means being connected to said memory means to compare in said normal mode the first through the P-th bits of said communication digital data signal with the first through the P-th bits of said specific digital data signal, respectively, to successively produce output coincidence pulses whenever p-th bits of said communication and said specific digital data signals are coincident with each other, where p consecutively varies from 1 to P;

said radio communication apparatus comprising a specific counter connected to said mode selecting means and to said comparing means in said normal mode for counting the output coincidence pulses produced in response to the first through the P-th bits of the specific digital data signal to produce a number coincidence signal which indicates that the first through the P-th bits of said communication digital data signal represents said identification number.

6. A radio communication apparatus as claimed in claim 5, wherein said memory means comprises:

a memory for memorizing first through P-th bits of a number signal representative of said identification number; and signal supply means connected to said timing pulse generating means and said memory for supplying said first through said P-th timing pulses to said memory to make said memory produce the first through the P-th bits of said number signal in bit synchronism with said first through said P-th timing pulses as the first through the P-th bits of said specific digital data signal.

7. A radio communication apparatus for receiving a radio communication signal carrying a communication digital data signal, said radio communication apparatus being for use in combination with a test transmitter including:

a test signal generator for generating a test digital data signal; and radio test signal transmitting means connected to said test signal generator for transmitting a radio test signal carrying said test digital data signal;

said radio communication apparatus including:

radio digital data recovering means for recovering said communication digital data signal from said radio communication signal and said test digital data signal as a receiver recovered digital data signal from said radio test signal;

wherein:

said radio communication apparatus comprises:

optical test signal transmitting means connected to said radio digital data recovering means for transmitting an optical test signal carrying said receiver recovered digital data signal;

said test transmitter comprising:

optical digital data recovering means for recovering said receiver recovered digital data signal as a transmitter recovered digital data signal from said optical test signal;

timing pulse generating means connected to said test signal generator for generating a timing pulse signal in bit synchronism with said test digital data signal;

comparing means connected to said test signal generator and said optical data recovering means for comparing said transmitter recovered digital data signal with said test digital data signal to successively produce bit coincidence pulses whenever said test digital data signal and said transmitter recovered digital data signal are coincident with each other bit by bit;

a first counter connected to said timing pulse generating means for counting up a first count in response to said timing pulse signal from an initial value to a predetermined threshold value to produce a count stop signal when said first count is counted up to said threshold value; and a second counter connected to said comparing means and said first counter for counting up a second count in response to said bit coincidence pulses from an initial count to an increased count until production of said count stop signal to produce a count signal which represents said increased count as a receiver sensitivity of said radio communication apparatus in relation to said communication digital data signal.

8. A test transmitter for use in testing radio communication apparatus for receiving a radio communication signal carrying a communication digital data signal.

said test transmitter including:
a test signal generator for generating a test digital data signal; and
radio test signal transmitting means connected to said test signal generator for transmitting a radio test signal carrying said test digital data signal;
said radio communication apparatus including:
radio digital data recovering means for recovering said communication digital data signal from said radio communication signal and said test digital data signal as a receiver recovered digital data signal from said radio test signal;
wherein said test transmitter comprises:
optical digital data recovering means for recovering said receiver recovered digital data signal as a transmitter recovered digital data signal from an optical test signal carrying said receiver recovered digital data signal, said optical test signal being transmitted by optical test signal transmitting means which is connected to said radio digital data recovering means in said radio communication apparatus;
timing pulse generating means connected to said test signal generator for generating a timing pulse signal in bit synchronism with said test digital data signal;
comparing means connected to said test signal generator and said optical data recovering means for comparing said transmitter recovered digital data signal with said test digital data signal to successively produce bit coincidence pulses whenever said test digital data signal and said transmitter recovered digital data signal are coincident with each other bit by bit;
a first counter connected to said timing pulse generating means for counting up a first count in response to said timing pulse signal from an initial value to a predetermined threshold value to produce a count stop signal when said first count is counted up to said threshold value; and
a second counter connected to said comparing means and said first counter for counting up a second count in response to said bit coincidence pulses from an initial count to an increased count until production of said count stop signal to produce a count signal which represents said increased count as a receiver sensitivity of said radio communication apparatus in relation to said communication digital data signal.

9. A test transmitter as claimed in claim 8, said test digital data signal successively comprising first through N-th bits, where N represents a first integer which is greater than one, said transmitter recovered digital data signal successively comprising first through N-th bits, said threshold value being greater than said initial value by a second integer which is greater than one and is not greater than said first integer; wherein:
said timing pulse generating means is for successively generating first through N-th timing pulses collectively as said timing pulse signal in bit synchronism with the first through the N-th bits of said second digital data signal;
said comparing means being for comparing the first through the N-th bits of said transmitter recovered digital data signal with the first through the N-th bits of said test digital data signal, respectively, to successively produce said bit coincidence pulses whenever n-th bits of said transmitter recovered digital data signal and said test digital data signal are coincident with each other, where n consecutively varies from 1 to N;
said first counter being for counting up said first count in response to at least a part of said first through said N-th timing pulses to produce said count stop signal when said first count increases up to said threshold value;
said second counter being for counting up said second count until production of said count stop signal in response to the bit coincidence pulses which are produced when n consecutively varies from 1 towards N, said second counter producing said count signal.

* * * * *